(12) United States Patent
Retersdorf (10) Patent No.: US 12,291,337 B2
(45) Date of Patent: May 6, 2025

(54) AIRCRAFT HYBRID COOLING SYSTEM

(71) Applicant: Raytheon Technologies Corporation, Farmington, CT (US)

(72) Inventor: Alan F. Retersdorf, Avon, CT (US)

(73) Assignee: RTX Corporation, Farmington, CT (US)

( * ) Notice: Subject to any disclaimer, the term of this patent is extended or adjusted under 35 U.S.C. 154(b) by 408 days.

(21) Appl. No.: 17/675,138

(22) Filed: Feb. 18, 2022

(65) Prior Publication Data

US 2023/0264818 A1 Aug. 24, 2023

(51) Int. Cl.
| | |
|---|---|
| B64D 13/06 | (2006.01) |
| F02C 9/18 | (2006.01) |
| F02K 3/00 | (2006.01) |
| F25B 9/00 | (2006.01) |
| F25B 25/00 | (2006.01) |

(52) U.S. Cl.
CPC ............... *B64D 13/06* (2013.01); *F02C 9/18* (2013.01); *F02K 3/00* (2013.01); *F25B 9/004* (2013.01); *F25B 25/005* (2013.01); *B64D 2013/0618* (2013.01); *B64D 2013/0644* (2013.01); *B64D 2013/0648* (2013.01); *B64D 2013/0674* (2013.01)

(58) Field of Classification Search
CPC ........... B64D 13/06; B64D 2013/0618; B64D 2013/0644; B64D 2013/0648; B64D 2013/0674; F02C 9/18; F02K 3/00; F25B 9/004; F25B 25/005
See application file for complete search history.

(56) References Cited

U.S. PATENT DOCUMENTS

| | | | |
|---|---|---|---|
| 3,339,349 A | 9/1967 | Farnum | |
| 4,681,610 A | 7/1987 | Warner | |
| 4,963,174 A | 10/1990 | Payne | |
| 4,966,005 A | 10/1990 | Cowell et al. | |
| 5,906,111 A | 5/1999 | Lui | |

(Continued)

FOREIGN PATENT DOCUMENTS

| | | |
|---|---|---|
| EP | 0994806 B1 | 6/2002 |
| JP | 2005067356 A | 3/2005 |
| JP | 2008-94189 A | 4/2008 |

OTHER PUBLICATIONS

US Office Action dated Mar. 31, 2023 for U.S. Appl. No. 17/675,191.

(Continued)

*Primary Examiner* — Larry L Furdge
*Assistant Examiner* — Keith Stanley Myers
(74) *Attorney, Agent, or Firm* — Bachman & LaPointe, P.C.

(57) ABSTRACT

An environmental control system (ECS) for use with a gas turbine engine has an air cycle system (ACS) and a vapor cycle system (VCS). The VCS has along a vapor compression flowpath: a VCS compressor; a heat donor leg of a VCS condenser; an expansion device; and a heat receiving leg of a VCS evaporator. The ACS has along a bleed flowpath: a bleed air inlet; a primary heat exchanger; an ACS compressor; a secondary heat exchanger; a turbine coupled to the ACS compressor to drive the ACS compressor; a heat donor leg of the VCS evaporator; a water collector; and a heat receiving leg of the VCS condenser.

19 Claims, 4 Drawing Sheets

(56) References Cited

U.S. PATENT DOCUMENTS

| | | | |
|---|---|---|---|
| 5,918,472 | A | 7/1999 | Jonqueres |
| 6,615,606 | B2 | 9/2003 | Zywiak |
| 6,971,241 | B2 | 12/2005 | Critchley et al. |
| 8,789,376 | B2 | 7/2014 | Coffinberry |
| 8,932,021 | B2 | 1/2015 | Colson et al. |
| 10,059,457 | B2 | 8/2018 | Klimpel et al. |
| 10,207,809 | B2 | 2/2019 | Koerner et al. |
| 10,501,191 | B1 | 12/2019 | Dooley et al. |
| 10,611,487 | B2 | 4/2020 | Behrens et al. |
| 10,934,007 | B2 | 3/2021 | Ho et al. |
| 11,077,949 | B2 | 8/2021 | Behrens et al. |
| 2009/0113896 | A1 | 5/2009 | Fukuda |
| 2010/0314877 | A1 | 12/2010 | Finney |
| 2015/0307196 | A1 | 10/2015 | Bruno |
| 2015/0314877 | A1 | 11/2015 | McAuliffe et al. |
| 2016/0347456 | A1 | 12/2016 | Bruno et al. |
| 2016/0355270 | A1 | 12/2016 | Bruno et al. |
| 2017/0305558 | A1 | 10/2017 | Bruno |
| 2018/0148179 | A1 | 5/2018 | Bruno |
| 2018/0215475 | A1 | 8/2018 | Hurt et al. |
| 2019/0135441 | A1 | 5/2019 | Bruno et al. |
| 2019/0284965 | A1 | 9/2019 | Retersdorf et al. |
| 2020/0002007 | A1 | 1/2020 | Retersdorf et al. |
| 2020/0025207 | A1 | 1/2020 | Mackin et al. |
| 2020/0277079 | A1 | 9/2020 | Retersdorf et al. |
| 2020/0340403 | A1 | 10/2020 | Bartosz et al. |
| 2021/0171204 | A1 | 6/2021 | Retersdorf |
| 2021/0188448 | A1 | 6/2021 | Retersdorf |
| 2021/0188449 | A1 | 6/2021 | Retersdorf |
| 2021/0245888 | A1* | 8/2021 | Liao ............... B64D 13/06 |
| 2021/0348564 | A1 | 11/2021 | Mackin et al. |
| 2022/0032219 | A1* | 2/2022 | Army ............... B01D 45/16 |

OTHER PUBLICATIONS

European Search Report dated Jul. 11, 2023 for European Patent Application No. 23157620.8.

European Search Report dated Jun. 30, 2023 for European Patent Application No. 23157612.5.

* cited by examiner

AIRCRAFT HYBRID COOLING SYSTEM

BACKGROUND

The disclosure relates to aircraft. More particularly, the disclosure relates to environmental control systems (ECS) in aircraft powered by gas turbine engines.

Gas turbine engines (used in propulsion and power applications and broadly inclusive of turbojets, turboprops, turbofans, and the like) power ECS in aircraft. One category of ECS are known as air cycle systems (ACS) sometimes identified by its air cycle machine (ACM) subsystem. Another group of ECS are known as vapor cycle systems (VCS).

In an example ACS, compressor bleed air is bled from an engine at an intermediate stage of compression. The compression has raised the temperature. Thus an example bleed is at a temperature of about 300° C. and a pressure of about 520 kPa. This may be distinguished from an in-flight external environmental condition of a temperature of about −15° C. and a pressure of about 60 kPa.

The bleed flowpath first passes through a primary heat exchanger (an air-to-air heat exchanger where the bleed flow is cooled by an environmental air flow such as a ram air flow). The bleed air exits the primary heat exchanger at a temperature of about 150° C.

Downstream of the primary heat exchanger, the bleed air is compressed by the centrifugal compressor of the ACM. The compression raises both temperature and pressure of the bleed flow. Bleed air exits the compressor at a temperature of about 280° C. and a pressure of about 830 kPa.

Downstream of the compressor, the bleed flowpath passes through a secondary heat exchanger (an air-to-air heat exchanger where the bleed flow is cooled by an environmental air flow such as a ram air flow—optionally the same air flow cooling the primary heat exchanger). The bleed air exits the secondary heat exchanger at a temperature of about 120° C.

Downstream of the secondary heat exchanger, the bleed air is expanded by the turbine of the ACM to mechanically drive the compressor. The expansion in the turbine lowers both temperature and pressure of the bleed flow. Bleed air exits the turbine at a temperature of about 40° C. and a pressure of about 410 kPa.

Downstream of the turbine, the bleed flowpath passes through a water collector (e.g., a can-type collector where swirl vanes centrifuge water from the airflow and the centrifuged water is drained). An example can-type water collector is shown in U.S. Pat. No. 4,681,610, (the '410 patent) of Warner, entitled "High performance water collector", and issued Jul. 21, 1987, the disclosure of which is incorporated by reference in its entirety herein as if set forth at length. A mesh or screen upstream of the collector helps coalesce the water droplets. An example of such a coalescing collector is shown in U.S. Pat. No. 3,339,349 (the '349 patent), of Farnum, entitled "Coalescer", and issued Sep. 5, 1967, the disclosure of which is incorporated by reference in its entirety herein as if set forth at length.

The bleed air exits the water collector at a temperature of about 40° C. Collected water may be dumped overboard directly or injected into the ram-air flow to enhance cooling in the primary and secondary heat exchangers. In other systems, the water collector is upstream of the turbine (e.g., immediately downstream of the secondary heat exchanger).

The cooled air may directly be used to cool a load such as avionics or may be blended with additional warmer air (e.g., an additional bleed or a bypass portion of the bleed) to provide cabin air services (e.g. pressurizing the cabin and providing heating or cooling).

In a condensing/reheat system variation on the particular example ACS of a water collector upstream of the turbine: 1) a reheat heat exchanger (reheater) heat rejecting/donor leg followed by a condenser heat rejecting/donor leg are added between the secondary heat exchanger and the water collector; 2) the reheater heat recipient/receiving leg is added downstream of the water collector; and 3) the turbine is moved to between the reheater heat recipient/receiving leg and the condenser heat recipient/receiving leg.

For example, U.S. Pat. No. 6,615,606, of Zywiak, entitled "Dual turbine bootstrap cycle environmental control system", and issued Sep. 9, 2003, discloses a particular condensing/reheat ACS. Heat receiving legs of a reheater and a condenser intervene between the secondary heat exchanger and the water collector upstream of a first turbine stage. Heat rejecting/donor legs of the condenser and reheater intervene between the first turbine stage and a second turbine stage.

Depending upon the nature of the aircraft, many of several cooling loads may predominate. These include passenger cabin climate control and avionics cooling. In passenger aircraft, the former predominate. In military aircraft, the latter predominate.

U.S. Pat. No. 4,966,005, of Cowell et al., and entitled "Advanced Hybrid Air/Vapor Cycle ECS", issued Oct. 30, 1990, discloses a hybrid system. Additionally, U.S. Pat. No. 10,059,457 of Klimpel et al., and entitled "Aircraft Air Conditioning System and Method of Operating an Aircraft Air Conditioning System", issued Aug. 28, 2018, discloses a hybrid system containing an ACS and VCS in which the ACS turbine provides the power input to the ACS compressor, VCS compressor, and ram fan.

Cooling capacity, especially for ACS, generally comes at the expense of engine bleed air, and thus either specific fuel consumption (SFC) or thrust.

SUMMARY

One aspect of the disclosure involves an environmental control system (ECS) for use with a gas turbine engine. The ECS comprises: an air cycle system (ACS); and a vapor cycle system (VCS). The VCS comprises along a vapor compression flowpath: a VCS compressor; a heat donor leg of a VCS condenser; an expansion device; and a heat receiving leg of a VCS evaporator. The ACS comprises along a bleed flowpath: a bleed air inlet; a primary heat exchanger; an ACS compressor; a secondary heat exchanger; a turbine coupled to the ACS compressor to drive the ACS compressor; a heat donor leg of the VCS evaporator; a water collector; and a heat receiving leg of the VCS condenser.

In a further embodiment of any of the foregoing embodiments, additionally and/or alternatively, a valve is positioned to bypass the turbine to pass a portion of flow along the bleed flowpath from the secondary heat exchanger around the turbine to the heat donor leg of the VCS evaporator.

In a further embodiment of any of the foregoing embodiments, additionally and/or alternatively, the bleed flowpath passes sequentially from the heat donor leg of the VCS evaporator to the water collector and then to the heat receiving leg of the VCS condenser.

In a further embodiment of any of the foregoing embodiments, additionally and/or alternatively, the water collector is a can-type collector.

In a further embodiment of any of the foregoing embodiments, additionally and/or alternatively, the turbine is a first turbine; and a second turbine is along the bleed flowpath.

In a further embodiment of any of the foregoing embodiments, additionally and/or alternatively: the second turbine is coupled to the ACS compressor to drive the ACS compressor; and the second turbine is downstream of the secondary heat exchanger and upstream of the heat donor leg of the VCS evaporator along the bleed flowpath.

In a further embodiment of any of the foregoing embodiments, additionally and/or alternatively: the heat donor leg of the VCS evaporator; the water collector; and the heat receiving leg of the VCS condenser are downstream of the first turbine and upstream of the second turbine along the bleed flowpath.

In a further embodiment of any of the foregoing embodiments, additionally and/or alternatively, the environmental control system further comprises: a heat transfer liquid flowpath; a cooling load on the heat transfer liquid flowpath; and at least one liquid load heat exchanger thermally coupling the bleed flowpath and heat transfer liquid flowpath.

In a further embodiment of any of the foregoing embodiments, additionally and/or alternatively, the at least one liquid load heat exchanger comprises: a first liquid load heat exchanger downstream of the first turbine and upstream of the second turbine along the bleed flowpath; and a second liquid load heat exchanger downstream the second turbine along the bleed flowpath.

In a further embodiment of any of the foregoing embodiments, additionally and/or alternatively: the VCS compressor is a motor-driven compressor; and the bleed flowpath passes downstream from the heat receiving leg of the VCS condenser to the second turbine.

In a further embodiment of any of the foregoing embodiments, additionally and/or alternatively: the second turbine is coupled to the VCS compressor to drive the VCS compressor; and the second turbine is downstream of the VCS condenser heat receiving leg along the bleed flowpath.

In a further embodiment of any of the foregoing embodiments, additionally and/or alternatively, a ram air flowpath passes through the primary heat exchanger and the secondary heat exchanger. The VCS lacks direct heat exchange with the ram flowpath.

In a further embodiment of any of the foregoing embodiments, additionally and/or alternatively, the ACS lacks a condensing/reheating loop.

In a further embodiment of any of the foregoing embodiments, additionally and/or alternatively: the VCS compressor is a motor-driven compressor; and the bleed flowpath passes downstream from the heat receiving leg of the VCS condenser to the second turbine.

In a further embodiment of any of the foregoing embodiments, additionally and/or alternatively: the VCS compressor is driven by the second turbine; and the second turbine is downstream of the VCS condenser heat receiving leg along the bleed flowpath.

In a further embodiment of any of the foregoing embodiments, additionally and/or alternatively, an aircraft includes the environmental control system and further comprises an engine having a compressor bleed port along the bleed flowpath.

In a further embodiment of any of the foregoing embodiments, additionally and/or alternatively, a ram air flowpath passes through the primary heat exchanger and the secondary heat exchanger.

In a further embodiment of any of the foregoing embodiments, additionally and/or alternatively the environmental control system further comprises: a heat transfer liquid flowpath; a cooling load on the heat transfer liquid flowpath, the cooling load comprising at least one radar transmit/receive module; and at least one liquid load heat exchanger thermally coupling the bleed flowpath and heat transfer liquid flowpath.

In a further embodiment of any of the foregoing embodiments, additionally and/or alternatively, a method for using the environmental control system comprises: running a gas turbine engine; directing bleed air along the bleed flowpath from the gas turbine engine; and the bleed air driving the turbine to drive the ACS compressor.

In a further embodiment of any of the foregoing embodiments, additionally and/or alternatively, the method further comprises: bypassing the turbine to control an inlet temperature to the heat donor leg of the VCS evaporator.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
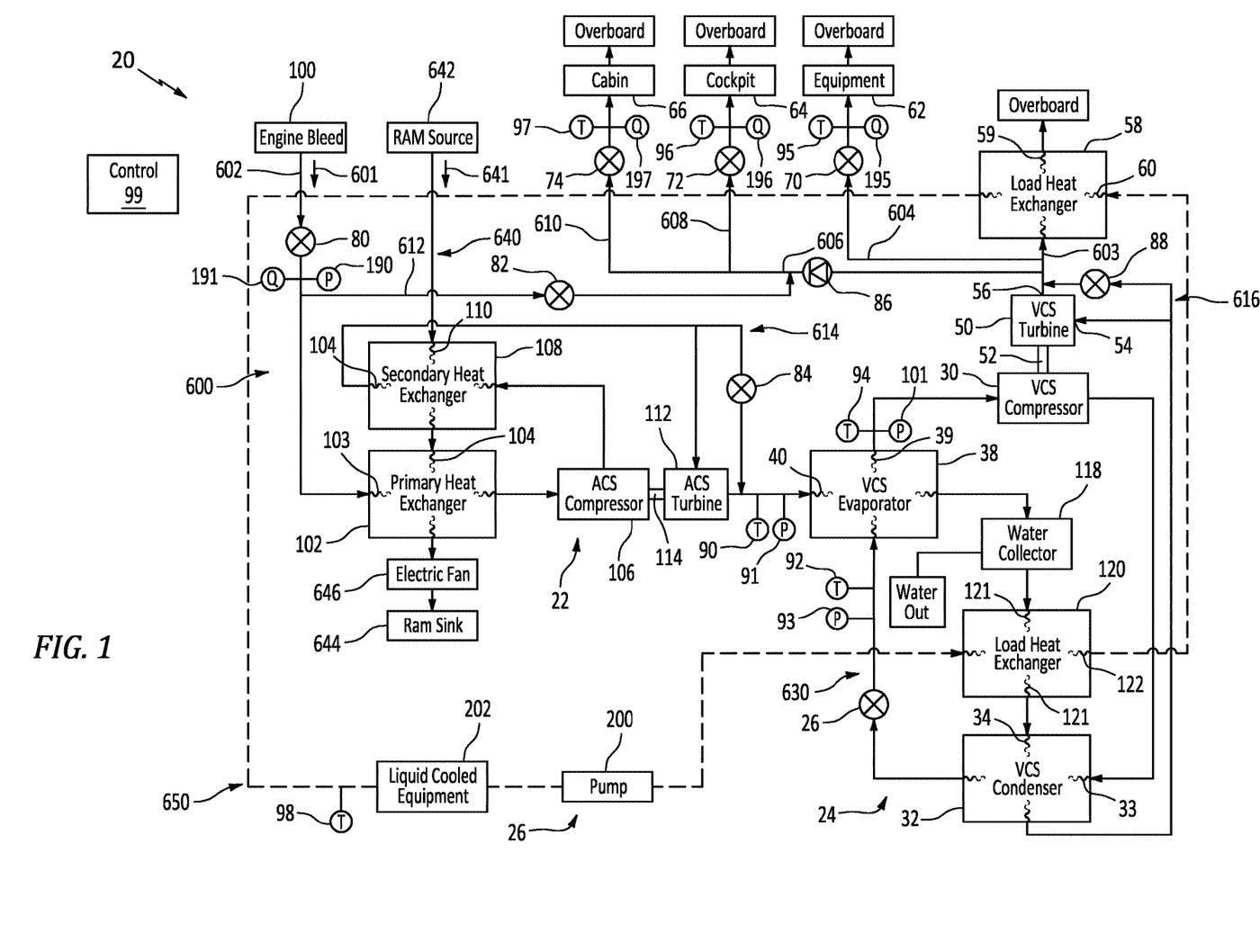
FIG. 1 is a schematic view of a first hybrid environmental control system (ECS).

FIG. 1 shows an aircraft environmental control system (ECS) 20 including an air cycle system (ACS) 22 in heat exchange relation and sharing components with a vapor cycle system (VCS) 24 and a pumped liquid heat transfer system 26. The ECS/ACS includes an air flowpath 600 which may be a bleed flowpath passing an air flow 601 (bleed flow) from a compressor bleed on an aircraft engine (discussed further below). The air flowpath 600 may be branching and may be an open flowpath ultimately venting out of the aircraft. Several examples are discussed below.

The VCS 24 has a VCS flowpath 630 in heat exchange with the air flowpath 600 at multiple locations. The example VCS flowpath is a closed recirculating flowpath. Example working fluid of the VCS may be a conventional refrigerant (e.g., a fluorocarbon such as R134a).

As is discussed further below, the FIG. 1 example ACS 22 and VCS 24 interface at three locations: two being heat exchangers; and one being an air-driven turbine powering the VCS compressor.

Thus, the example VCS 24 includes, sequentially, along the example VCS flowpath 630: a VCS compressor 30; a VCS heat rejection heat exchanger 32 (e.g., condenser), namely a heat rejection leg 33 thereof; a VCS expansion device 36 (e.g., a direct-actuated expansion valve (e.g., electronic expansion valve (EXV) or a thermostatic expansion valve (TXV)); and a VCS heat absorption heat exchanger 38 (e.g., evaporator), namely a heat recipient/receiving leg 39 thereof; before returning to the VCS compressor 30. Each of these components has respective inlets and outlets and may be connected via appropriate conduit (e.g., metal piping). As noted above, the VCS compressor 30 is driven by the VCS turbine 50. For example, the VCS turbine 50 and VCS compressor 30 may be formed by co-spooled impellers on a single shaft (VCS shaft) 52 mounted for rotation about a VCS shaft axis by multiple bearings (not shown). In an alternative embodiment, this mechanical connection can be made with two shafts that are magnetically coupled. Such magnetic coupling may be preferred to reduce the likelihood of refrigerant leakage into the air cycle system.

The VCS turbine 50 has an air inlet 54 from the ACS and an air outlet 56. Although the example VCS flowpath 630 is a single recirculating loop, other variations may have additional components, bypasses, and the like.

The ACS 22 has, sequentially along the air flowpath 600 (namely a trunk 602 of the air flowpath): an inlet 100 at an engine bleed port; a primary heat exchanger 102, namely a heat rejection/donor leg 103 thereof; a compressor (ACS compressor) 106; a secondary heat exchanger 108, namely a heat rejection/donor leg 109 thereof; a turbine (ACS turbine) 112; a heat rejecting/donor leg 40 of the VCS evaporator 38; a water collector 118; a load heat exchanger 120 (an upstream load heat exchanger), namely a heat recipient/receiving leg 121 thereof; a heat recipient/receiving leg 34 of the VCS condenser 32; the VCS turbine 50; and then one or more downstream loads.

In the example, the downstream loads 58, 62, 64, and 66 are on respective branches. The air flowpath may be bounded by ducts linking the various heat exchangers and similar components discussed further below. A first branch 603 passes through a load heat exchanger 58 (a downstream load heat exchanger) and then is dumped overboard. As is discussed further below, the load heat exchangers 58 and 120 receive heat from the pumped liquid heat transfer system 26 and its fluid loop (flowpath) 650.

A second branch 604 feeds the load 62. The example load 62 is air-cooled equipment (e.g., avionics or other electronics). In one example, the air-cooled equipment is in an equipment bay in the fuselage and the bleed air along the branch 604 is flowed through the equipment bay otherwise unconstrained and vents overboard from the equipment bay. In alternative embodiments, the air flow along the branch 604 may pass constrained through a heatsink to remove/receive heat from the equipment. In the example, a flow control valve 70 is positioned along the branch 604 under control of a control system (controller) 99 which may represent existing control equipment such as a conventional computer or microcontroller-based ACS controller. The controller may be coupled directly or indirectly to various sensors, input devices, controlled components, and the like via hardwired analog or digital lines including wires or fiber optics. The example valve 70 is a continuous control throttle valve such as a butterfly valve (e.g., as opposed to a bi-static valve such as a solenoid and/or pulse-width-modulated (PWM) valve). Example actuators for this valve and the other valves include pneumatic actuators and a stepper motors.

The example remaining loads 64 and 66 represent cabin and air services such as cockpit cooling and pressurization 64 and cabin cooling and pressurization 66. They may be fed via respective sub-branches 608 and 610 off of a branch 606. The branches 608 and 610 may have valves 72 and 74 (e.g., otherwise similar to the valve 70 discussed above).

In addition to the load branches, the ACS 22 may comprise one or more bypasses. FIG. 1 shows bypass flowpaths (bypasses) 612 and 614. The bypass 612 bypasses relatively warm engine bleed air from a location in the air flowpath trunk 602 upstream of the primary heat exchanger 102 to a location for mixing with one or more of the loads. The example mixing location is along the branch 606. As noted above relative to the prior art, this so-called trim branch/bypass 612 allows mixing of the relatively warm bleed with the relatively cool air exiting the VCS turbine 50 along the branch 606. The control of the proportions of the mixing allow control over temperature of air introduced to the loads 62 and 64 and thus allow control over cockpit temperature and cabin temperature. In the illustrated example, the overall bleed flow from the engine is controlled by a valve 80 (e.g., otherwise similar to the valve 70) in the bypass flowpath 600 trunk 602 upstream of the trim bypass 612 and flow along the trim bypass 612 is controlled by a valve 82 (e.g., otherwise similar to the valve 70) in the trim bypass.

An optional additional bypass flowpath (bypass) 614 is an ACS turbine bypass flowpath extending from a location in the air flowpath trunk 602 between the secondary heat exchanger 108 heat rejecting/donor leg 109 and ACS turbine 112 inlet to a location between the ACS turbine outlet and the VCS evaporator heat rejecting/donor leg 40 inlet (hot inlet). An example ACS turbine bypass 614 has a valve 84 (e.g., otherwise similar to the valve 70). The bypass valve 84 (e.g., butterfly valve) may be opened and closed to selectively unload the first ACS turbine. The example control is continuous so that the bypassed air mixes with the turbine output air. The more open the valve 84, the greater the bypass fraction and the greater the temperature of the mixture. Thus, continuous control of the valve 84 allows continuous control over the temperature downstream of the bypass.

The example ACS also includes a check valve 86 in the branch 606 upstream of the junction with the trim bypass 612. The check valve 86 is oriented to prevent a reverse flow.

An additional bypass flowpath (bypass) 616 is a VCS turbine bypass flowpath extending from a location in the air flowpath trunk 602 between the VCS condenser 32 heat receiving/recipient leg 34 and VCS turbine 50 inlet to a location between the VCS turbine outlet and the check valve 86. An example VCS turbine bypass 616 has a valve 88 (e.g., otherwise similar to the valve 70).

In operation, there will be a pressure drop across the VCS turbine 50 when the turbine is running. Although it may be desirable to moderate cockpit and cabin temperature via blending of warm bleed air, this may not be the case with the air-cooled equipment 62 and load heat exchanger 58. The check valve 86 thus prevents the trim air from warming the main bleed air delivered to the air-cooled equipment 62 and load heat exchanger 58. Temperature of the air flow exiting the VCS turbine 50 to the branches 603 and 604 and the branch 606 upstream of the junction with the trim bypass 612 may be controlled via bypassing the VCS turbine 28 using the VCS turbine bypass valve 88 with increased bypass increasing temperature and decreased bypass decreasing temperature.

As with the example VCS compressor 30, the ACS compressor 106 is powered by its associated turbine 112. For example, the ACS turbine 112 and ACS compressor 106 may be formed by co-spooled impellers on a single shaft (ACS shaft) 114 mounted for rotation about an ACS shaft axis by multiple bearings (not shown). In the normal operational mode, the VCS evaporator 38 functions to cool the output of the ACS turbine 112 to condense water in the water collector 118 and further provide cooled air for use in the load heat exchanger, and subsequent downstream loads.

The example liquid flowpath 650 passes sequentially through a pump 200 to the heat rejection/donor leg 122 of the load heat exchanger 120, then the heat rejecting/donor leg 60 of the load heat exchanger 58 (the heat recipient/receiving leg being 59 along the air flowpath) and then to liquid cooled equipment 202 (forming the ultimate load of the pumped liquid heat transfer system 26) before returning to the pump. In the liquid cooled equipment, the liquid may pass through one or more passageways in a heatsink or the like. The example liquid cooled equipment is radar. Although the example liquid flowpath 650 is a single recirculating loop, other variations may have additional components, bypasses, and the like. An example pump is a centrifugal pump powered by an electric motor drawing current from an engine-integrated generator or an accessory generator (not shown, e.g., of conventional form). Additionally, the flow path may utilize valves and parallel or other branching flowpath segments to allow liquid flow to be allocated to each load heat exchanger in varying ratios to improve heat removal capability.

Figure 3:
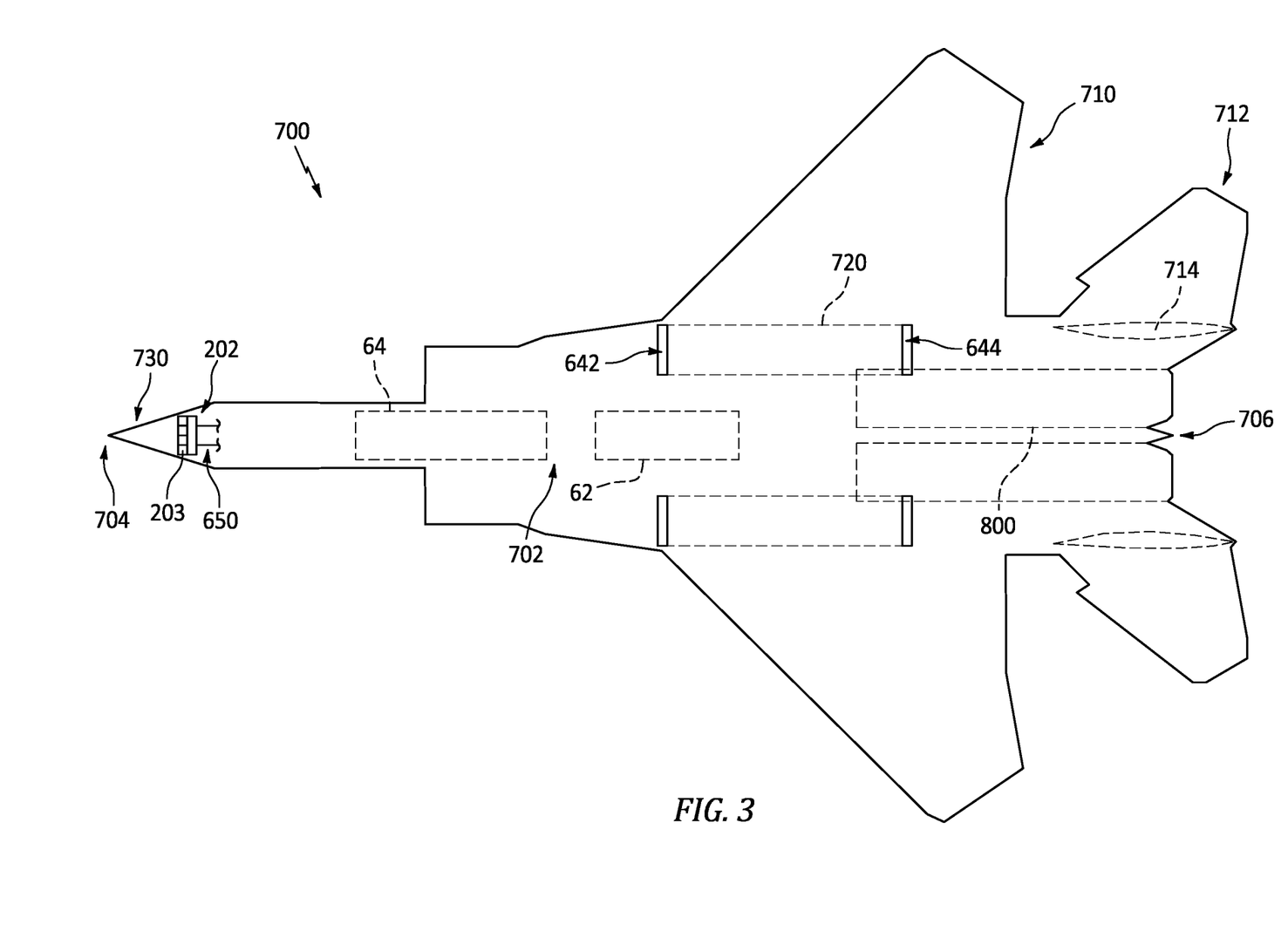
FIG. 3 is a schematic bottom view of an aircraft including an ECS.

In one example, the air-cooled equipment/load 62 is avionics equipment (e.g., electronics) in an equipment bay; whereas the liquid-cooled load/equipment 202 is radar equipment such as one or multiple radar transmitter/receiver modules 203 (FIG. 3). Example radar locations include within a nose radome for typical combat aircraft. Dorsal or ventral radomes (not shown) are common on airborne early warning (AEW) aircraft and the like. Liquid cooling may be preferable to air cooling if equipment cannot be located in an air-cooled equipment bay (e.g. remote locations) or when the equipment requires significant amounts of cooling.

Additionally, throughout the system there may be various temperature sensors and pressure sensors. Example temperature sensors are thermocouples or thermistors. Example pressure sensors are piezoelectric diaphragm sensors. FIG. 1 shows a basic example of a temperature sensor 90 and pressure sensor 91 downstream of the ACS turbine bypass 614 (measuring conditions of the blended flow from the ACS turbine outlet and ACS turbine bypass or VCS evaporator heat rejecting/donor leg inlet conditions); a temperature sensor 92 and a pressure sensor 93 between VCS expansion device 36 and the VCS evaporator heat receiving/recipient leg 39 inlet (measuring conditions of the evaporator inlet refrigerant flow); a temperature sensor 94 between the VCS evaporator heat recipient/receiving leg 39 outlet and the VCS compressor 30 inlet; a temperature sensor 95 in the branch 604 (measuring air temperature delivered to the load 62); temperature sensors 96 and 97 respectively in the branches 608 and 610 downstream of the trim bypass (measuring blended air temperatures for the loads 64 and 66); and a temperature sensor 98 in the liquid loop 650 upstream of the liquid cooled equipment 202. Flow rate sensors 195, 196, and 197 may measure the respective air flow rates to the loads. Example flow sensors are Venturi-type sensors or hot wire anemometers. FIG. 1 also shows an upstream pressure sensor 190 and flow rate sensor 191 in the trunk 602 (e.g., just downstream of the valve 80).

Thus, an example bleed is at a temperature of about 300° C. and a pressure of about 520 kPa. The primary heat exchanger 102 is "primary" in that it serves to remove heat acquired during compression in the engine. It is typically an air-to-air heat exchanger where the bleed flowpath provides the heat rejecting/donor leg and the heat recipient/receiving leg is formed such as by ambient air of a ram air flow along a ram air flowpath 640. The bleed air exits the primary heat exchanger heat rejecting/donor leg 103 at an example temperature of about 150° C.

The example ram air flowpath 640 passing a ram air flow 641 extends from a ram air inlet 642 to a ram air outlet 644. These may be respective ports on the fuselage or on a wing. The ram air flowpath 640 passes downstream through the heat receiving/recipient leg 110 of the secondary heat exchanger, the heat receiving/recipient leg 104 of the primary heat exchanger, and through an optional electric fan 646 (e.g., driven by an electric motor drawing current from an engine-integrated generator or an accessory generator (not shown, e.g., of conventional form)) before exiting the outlet 654.

The example ACS compressor 106 is a centrifugal compressor having an axial inlet and a radial outlet. The compressed air exits the ACS compressor at an example temperature of about 220° C. and an example pressure of about 720 kPa.

The secondary heat exchanger 108 is "secondary" in that it serves to remove heat acquired during compression in the ACS compressor. It is typically an air-to-air heat exchanger where the bleed flowpath provides the heat rejecting/donor leg and the heat recipient/receiving leg is formed such as by ambient air of a ram air flow which may be the same as that of the primary heat exchanger. In the illustrated example, the secondary heat exchanger is upstream of the primary heat exchanger along the ram air flowpath 640 so as to have a lower outlet temperature along the ACS bleed flowpath. The bleed air exits the secondary heat exchanger heat rejecting/donor leg 109 at an example temperature of about 120° C.

Bleed air exits the ACS turbine 112 at an example temperature of about 45° C. and an example pressure of about 360 kPa. Modulation (e.g., continuous variable control) of bypass valve 84 can be used to control the flow through the bypass flowpath 614. This, in turn, controls both air temperature exiting the turbine 112 and of the blend entering the VCS evaporator hot inlet 40. The temperature sensor may be sufficiently downstream of the junction of the bypass with the main flowpath as allow full blending and avoid fluctuation.

If the air entering the hot inlet 40 of the VCS evaporator 38 is too hot, the VCS evaporator 38 may not be able to sufficiently cool the air to create enough water condensate to ensure sufficient water removal from the water collector 118.

However, if the air entering the hot inlet 40 of VCS evaporator 38 is cold enough that the bulk of the free moisture entering the water collector 118 was created within the turbine 112, water removal via the water collector 118 is likely to be poor. This is because free moisture created within a turbine tends to have very small particle sizes, whereas free moisture created in a heat exchanger is likely to have large enough particle sizes to allow removal from the free stream air via the can-type water collector 118. The bulk of the free moisture entering the water collector 118 may be too fine because of the condensation forming within turbine 112 instead of VCS evaporator 38. It may also be possible to form ice within the VCS evaporator 38, creating a blockage that could decrease performance or require the system to shut down. Thus control of the bypass flow via the valve 84 may keep those temperatures at targets or within ranges to limit or avoid those problems. This may provide finer control over moisture and more water removal than other ACS.

The VCS evaporator 38 is a refrigerant-air heat exchanger, e.g., brazed plate-fin heat exchanger. Bleed air exits the VCS evaporator 38 heat rejecting/donor leg 40 at an example temperature of about 5° C.

The example water collector is a can-type collector (e.g., as in the '410 patent). The bleed air exits the water collector at an example temperature of about 5° C.

The example upstream load heat exchanger 120 is a brazed plate-fin heat exchanger and functions to remove/receive heat from a liquid heat transfer fluid loop (flowpath) 650 that provides liquid cooling to equipment (discussed below). The example heat transfer liquid is a polyolefin (e.g., a polyalphaolefin (PAO)) or other natural or synthetic oil or blend thereof. The bleed air exits the first/upstream load heat exchanger 120 heat recipient/receiving leg 121 at an example temperature of about 25° C.

The VCS condenser 32 is a refrigerant-air heat exchanger, e.g., brazed plate-fin heat exchanger. The bleed air exits the VCS condenser 32 heat recipient/receiving leg 34 at an example temperature of about 90° C.

The bleed air exits the VCS turbine 50 at an example temperature of about 10° C. and an example pressure of about 140 kPa. Modulation (e.g., continuous variable control) of the bypass valve 88 can be used to control the flow through the bypass flowpath 616. This, in turn, controls both air temperature exiting the VCS turbine 150 and of the blend proceeding downstream toward the loads. This blend temperature can be targeted to meet requirements for the various air services (62, 64, or 66) or the load heat exchanger 58. If the air to the load heat exchanger 58 or to the various air services (62, 64, or 66) is too cold, ice may form which could degrade performance or require the system to be shut down. If the air to the load heat exchanger 58 or to the various air services (62, 64, or 66) is too hot, then sufficient cooling may not be provided.

The example second/downstream load heat exchanger 58 is a brazed plate-fin heat exchanger and functions to remove/receive heat from the liquid heat transfer fluid loop. The bleed air exits the downstream load heat exchanger 58 heat recipient/receiving leg at an example temperature of about 20° C.

The example air services are cockpit cooling and pressurization, cabin cooling and pressurization, and equipment cooling.

In further variations on the FIG. 1 ECS, more complex or otherwise different VCS may be used. For example, the VCS may represent various known or developed refrigeration cycles (e.g., including ejector cycles) and may include additional components such as receivers, accumulators, additional heat exchangers, lubrication systems, and the like.

Additionally, there may be more, fewer, or different loads and their associated heat exchangers or other components.

Figure 2:
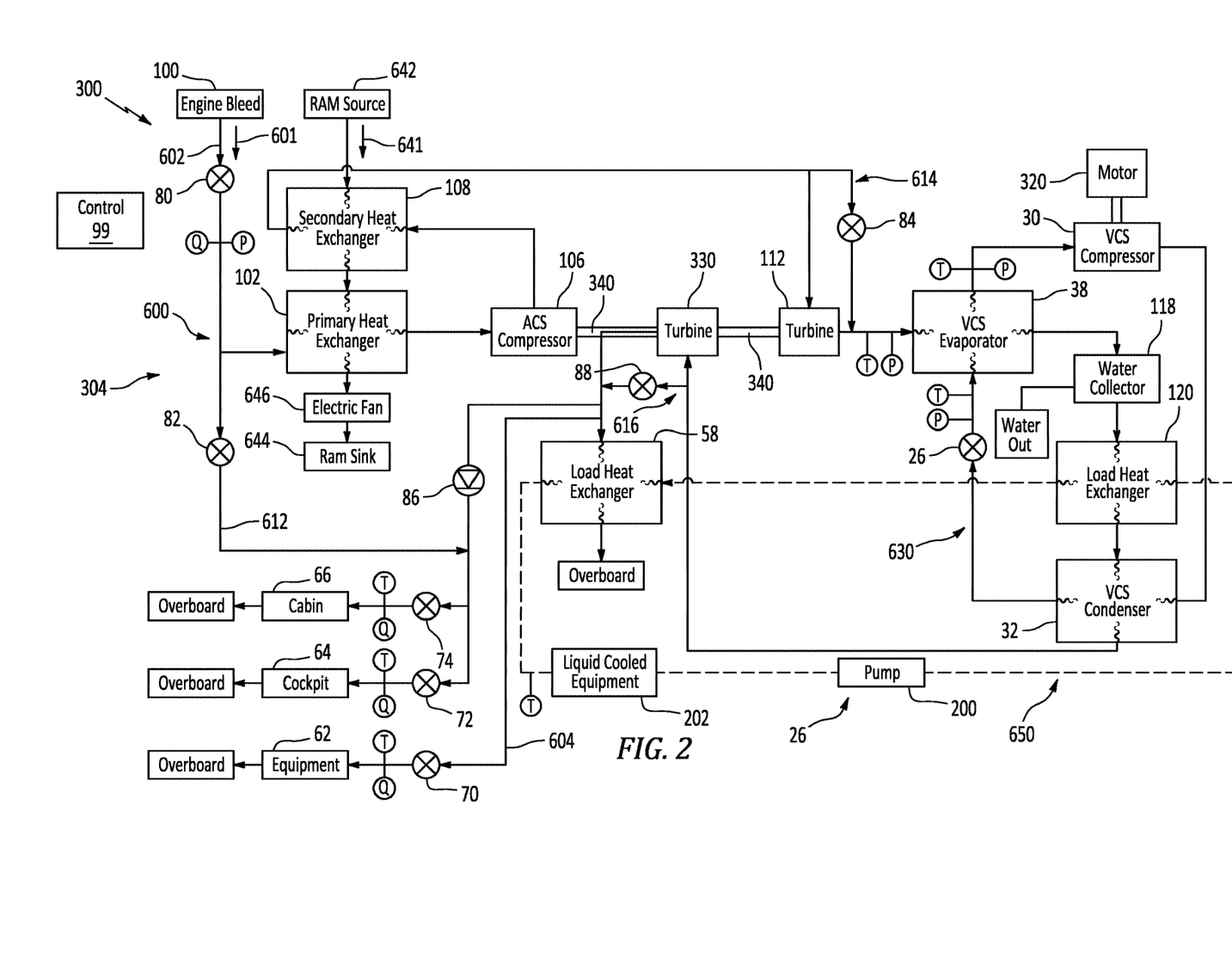
FIG. 2 is a schematic view of a second hybrid ECS.

FIG. 2 shows a further variation of an ECS 300 altering how the ACS 304 compressor 106 and VCS compressor 30 are powered. Rather than being powered by air from the ACS 302, the VCS compressor is powered by a motor 320. An example motor 320 is an electric motor. An example electric motor is an AC electric drive motor powered by an engine-integrated generator or an accessory generator (not shown, e.g., of conventional form). When powered by such a motor rather than by a turbine, the example VCS compressor may still take the form of a centrifugal compressor.

After leaving the VCS condenser 32, the airflow powers a second turbine (second ACS turbine) 330 which cooperates with the first turbine 112 to, in turn, power the ACS compressor 106. In normal operation with flows sequentially from the first turbine 112 to the second turbine 330, the first turbine is thus a higher pressure turbine with higher inlet pressure and higher outlet pressure than the second turbine (lower pressure turbine). Thus, the impellers of the two ACS turbines may be co-spooled with the impeller of the ACS compressor on a shared shaft 340.

As with the FIG. 1 embodiment, as an additional variation, the air flowpath 600 includes an optional bypass branch 614 (bypass) bypassing the first ACS turbine 112.

Relative to the FIG. 1 embodiment, the FIG. 2 embodiment comprises a "3-wheel" air cycle machine with two air turbines powering the air compressor and a VCS compressor driven by an electric motor drawing current from an engine-integrated generator or an accessory generator. This arrangement allows more of the energy extracted from the bleed air to be used to power the air compressor. That may be advantageous by allowing more heat rejection via the secondary heat exchanger 108 and more pressure available for expansion across turbine 112 and turbine 330. The greater pressure provides the potential for similar levels of cooling capability with less bleed flow from the engine, improving engine SFC. The VCS compressor may also be easier to design for efficiency performance by decoupling it from an air turbine. One disadvantage to this 3-wheel approach is the extra volume and weight for the VCS compressor electric motor. The electric motor will also require a connection to a power source as discussed above.

As with the FIG. 1 embodiment, the FIG. 2 embodiment's use of two turbines may increase energy extraction relative to a single turbine, with the VCS sinking heat to the ACS between the two turbines. Relative to alternative hybrid systems both examples eliminate a direct ram air heat sink in the VCS, saving weight and complexity. Similarly, both examples avoid a condensing/reheat loop in the ACS. Similarly, both examples may allow increased water removal by having the VCS cool the bleed upstream of the collector.

FIG. 3 schematically shows an aircraft including the ECS. The example aircraft 700 has a fuselage 702. The fuselage extends from a nose 704 to a tail 706. A main wing 710 extends laterally outward from the fuselage on left and right sides. A horizontal stabilizer 712 and vertical stabilizer(s) (two in the example) 714 are proximate the tail aft of the main wing. In the fuselage-integrated example, the bulk of ECS equipment including the various heat exchangers, the ACS compressor, the turbines, the VCS compressor, and the VCS compressor motor (if any) are contained in respective fuselage bays 720 adjacent the respective associated engines. This allows compact routing of the bleed flowpath. FIG. 3 schematically shows separate ECS associated with the respective engines with each having a ram air inlet 642 and a ram air outlet 644.

In some aircraft such as military aircraft such as a fighter or some bombers, there may be no separate cabin air service and just cockpit environmental control and equipment cooling loads.

There may be two completely separate ECS or the ECS may share certain components such as combining to feed the cabin, cockpit, air cooled equipment, and/or liquid cooled equipment. The ACS may also be configured to allow the two ACS to both receive bleed air from the same engine in certain abnormal conditions such as a failure of the other engine. In any such implementation appropriate valves, cross-linking ducts or piping, and the like may be provided to allow the particular operation and isolate any damage that would cause leakage.

FIG. 3 also schematically shows the nose radome 730, the cockpit 64, and the air cooled equipment 62.

FIG. 3 also schematically shows the ram air inlet 642 and outlet 644 for each ECS. However, these locations may represent the full spectrum of existing ram air inlet and outlet locations. The illustrated example also shows how use of the liquid loop 650 (which can be formed by small diameter conduit and, depending upon implementation, even flexible tubing (plastic or other polymeric)) allows routing to remote locations versus much higher diameter conduit required for routing cooling air. The single loop 650 shown in the FIG. 3 example may represent a pair of such loops (one from each engine's ECS) cooling the load 202 in parallel for redundancy (e.g., two separate liquid circuits through a heat sink). Or a given load 202 may be cooled by a single engine's ECS. Or the two engines may share a liquid loop among other possible variations.

Other combat aircraft configurations exist including delta wing and delta canard configurations among other configurations lacking the traditional combination of vertical stabilizer and horizontal stabilizer. The example aircraft has engines positioned such that they are integral to the fuselage.

Alternative aircraft configurations include pylon-mounted engines with respective engine nacelles mounted by respective pylons to the aircraft wing or fuselage. Such pylons are more characteristic of civilian aircraft or converted/adapted civilian aircraft such as used in AEW situations. Such pylon mountings are also used in military transport and legacy bomber aircraft.

Typical engines are turbofans with pylon-mounting situations being generally associated with civilian aircraft and fuselage-integrated engines generally associated with combat aircraft. Typical pylon-mounting situations involve high bypass turbofans whereas typical fuselage-integrated engines are low bypass turbofans. Nevertheless, the foregoing teachings are also applicable to unducted fans, turbojets, turboprops, and other variations.

Figure 4:
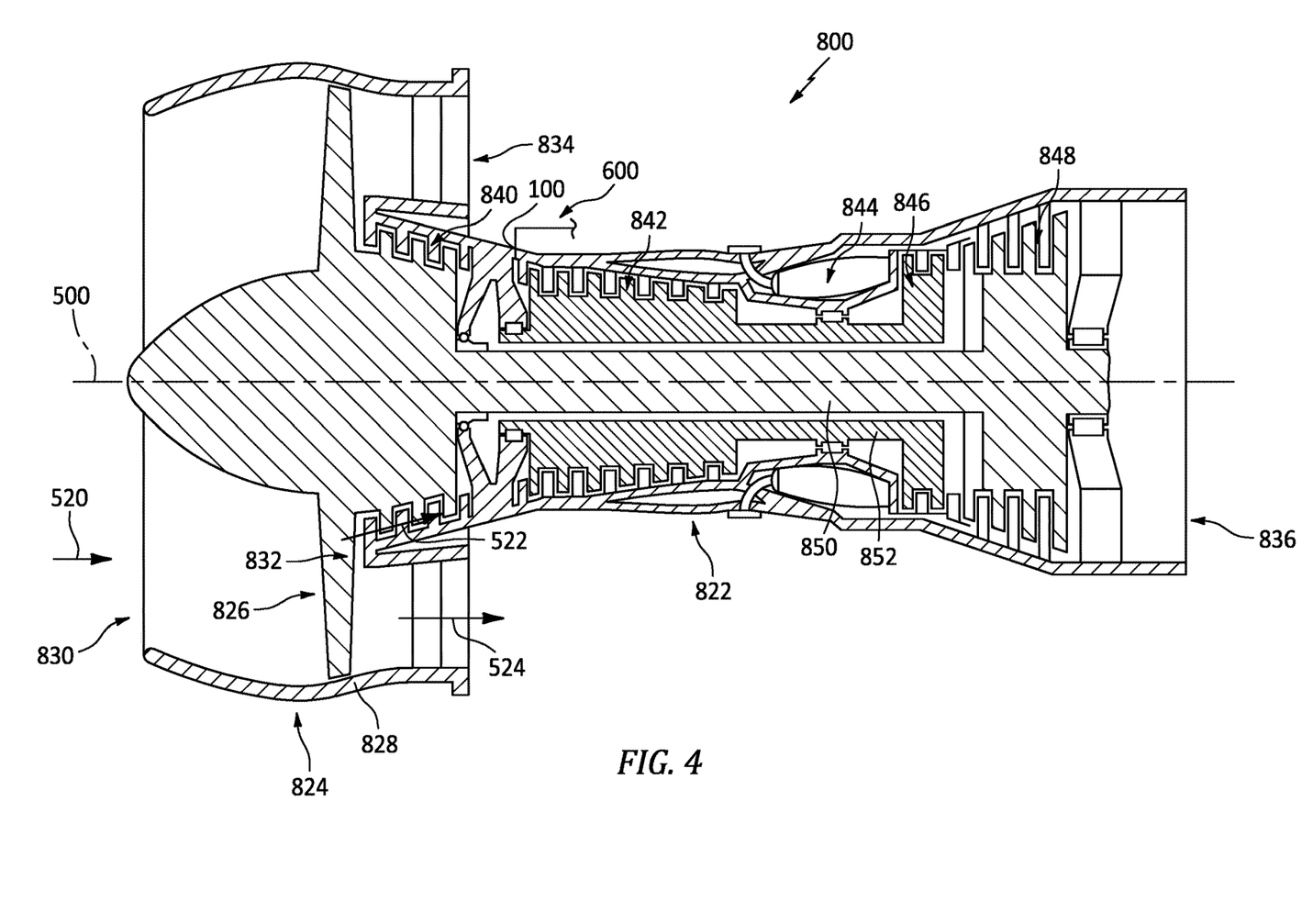
FIG. 4 is a schematic view of an engine of the aircraft.

FIG. 4 shows an example turbofan engine. The example engine is generally illustrated as a two-spool high bypass turbofan. However, as noted above, low bypass turbofans may have the same general sections and may additionally include reheat equipment, variable exhaust nozzles, and the like. And other spooling arrangements are possible.

Control hardware, such as a conventional computer or microcontroller-based ACS controller, may be located within the bay that is housing the combined ACS and VCS system.

Component materials and manufacture techniques and assembly techniques may be otherwise conventional.

In a control example, the controller 99 provides feedback control over inlet pressure to the ACS via control of the valve 80. The controller 99 receives a signal from the pressure sensor 190 that relates to the pressure just downstream of valve 80. The controller 99 is pre-programmed with a look-up table or equation that provides a reference value (the target pressure or proxy) based on parameters such as one or more of altitude, external temperature, external pressure, airspeed, and the like. Typically this will at least include altitude. The controller 99 compares the signal from the pressure sensor 190 to the reference value. The controller 99 sends a signal to the actuator for the valve 80 to increase valve position (open the valve more) if the signal from the pressure sensor 190 is less than the reference value. The controller 99 sends a signal to the actuator for the valve 80 to decrease valve position (close the valve more) if the signal from the pressure sensor 190 is greater than the reference value.

In an alternative control example, the controller 99 controls the mass flow rate into the system instead of the pressure into the system. The controller 99 receives a signal from the mass flow rate sensor 191 that relates to the mass flow rate just downstream of valve 80. Example flow sensors are Venturi-type sensors or hot wire anemometers. The controller 99 is pre-programmed with a look-up table or equation that provides a reference value (for the mass flow rate or proxy) based on parameters such as one or more of altitude, external temperature, external pressure, airspeed, and the like. Typically this will at least include altitude. The controller 99 compares the signal from the mass flow rate sensor 191 to the reference value. The controller 99 sends a signal to the actuator for the valve 80 to increase valve position (open the valve more) if the signal from the mass flow rate sensor 191 is less than the reference value. Controller 99 sends a signal to the actuator for the valve 80 to decrease valve position (close the valve more) if the signal from the mass flow rate sensor 191 is greater than the reference value.

The controller 99 controls the air temperature into the cold inlet of VCS evaporator 38. The controller 99 receives a signal from the temperature sensor 90 that relates to the air temperature at the cold inlet of VCS evaporator 38. The controller 99 is pre-programmed with a look-up table or equation that provides a reference value (the temperature or proxy) based on parameters such as one or more of altitude, external temperature, external pressure, airspeed, and the like. Typically this will at least include altitude. The controller 99 compares the signal from the temperature sensor 90 to the reference value. The controller 99 sends a signal to the actuator for the valve 84 to increase valve position (open the valve more) if the signal from the temperature sensor 90 is less than the reference value. The controller 99 sends a signal to the actuator for the valve 84 to decrease valve position (close the valve more) if the signal from the temperature sensor 90 is greater than the reference value.

The controller 99 controls the air temperature to cockpit 64 and cabin 64. The controller 99 receives a signal from the temperature sensor 96 that relates to the temperature of the air flowing to cockpit 64 and a signal from the temperature 97 that relates to the temperature of the air flowing to cabin 66. The controller 99 is pre-programmed with two look-up tables or equations, one for the cockpit air flow temperature and one for the cabin air flow temperature, that provide reference temperature (or proxy) values based on parameters such as one or more of altitude, external temperature, external pressure, airspeed, and the like. Typically this will at least include altitude. The pilot may make use of a manual override function to allow for setting a higher reference temperature for additional heating when desired. The controller 99 sends a signal to the actuator for the valve 82 to increase valve position (open the valve more) if the signal from the temperature sensor 96 is less than the cockpit reference value or if the signal from the temperature sensor 97 is less than the cabin reference value. The controller 99 sends a signal to the actuator for the valve 82 to decrease valve position (close the valve more) if the signal from the temperature sensor 96 is greater than the cockpit reference value or if the signal from the temperature sensor 97 is greater than the cabin reference value.

The controller 99 controls the mass flow rate to provide cooling to equipment 62. The controller 99 receives signals from the temperature sensor 95 and mass flow rate sensor 195 that relate to the temperature and mass flow rate, respectively, to equipment 62. The controller 99 is pre-programmed with a look-up table or equation that provides a reference value (the mass flow rate or proxy) based on parameters such as one or more of altitude, external temperature, external pressure, airspeed, and the like (typically this will at least include altitude), as well as the signal from the temperature sensor 95. The controller 99 sends a signal to the actuator for the valve 70 to increase valve position (open the valve more) if the signal from the mass flow rate sensor 195 is less than the reference value. The controller 99 sends a signal to the actuator for the valve 70 to decrease valve position (close the valve more) if the signal from the mass flow rate sensor 195 is greater than the reference value.

The controller 99 controls the mass flow rate to provide conditioned air to cockpit 64. The controller 99 receives signals from the temperature sensor 96 and mass flow rate sensor 196 that relate to the temperature and mass flow rate, respectively, to cockpit 64. The controller 99 is pre-programmed with a look-up table or equation that provides a reference value (the mass flow rate or proxy) based on parameters such as one or more of altitude, external temperature, external pressure, airspeed, and the like (typically this will at least include altitude), as well as the signal from the temperature sensor 96. The controller 99 sends a signal to the actuator for the valve 72 to increase valve position (open the valve more) if the signal from the mass flow rate sensor 196 is less than the reference value. The controller 99 sends a signal to the actuator for the valve 72 to decrease valve position (close the valve more) if the signal from the mass flow rate sensor 196 is greater than the reference value.

The controller 99 controls the mass flow rate to provide conditioned air to cabin 66. The controller 99 receives signals from the temperature sensor 97 and mass flow rate sensor 197 that relate to the temperature and mass flow rate, respectively, to cabin 66. The controller 99 is pre-programmed with a look-up table or equation that provides a reference value (the mass flow rate or proxy) based on parameters such as one or more of altitude, external temperature, external pressure, airspeed, and the like (typically this will at least include altitude), as well as the signal from the temperature sensor 97. The controller 99 sends a signal to the actuator for the valve 74 to increase valve position (open the valve more) if the signal from the mass flow rate sensor 197 is less than the reference value. The controller 99 sends a signal to the actuator for the valve 74 to decrease valve position (close the valve more) if the signal from the mass flow rate sensor 197 is greater than the reference value.

The controller 99 controls the amount of superheat at the exit of VCS evaporator 38 to ensure sufficient superheat for operation of the VCS compressor 30. The controller 99 receives signals from the temperature sensor 94 and pressure sensor 101 that relate to the temperature and pressure, respectively, of the refrigerant at the exit of VCS evaporator 38. The controller 99 is pre-programmed with a look-up table or equation that provides a reference value that allows for determining the amount of superheat at the refrigerant exit of VCS evaporator 38 from these two signals. The controller 99 compares this value to a static reference superheat value (or target range) to ensure operation and performance of VCS compressor 30. Too low a superheat can damage the compressor due to liquid inclusion. However excess superheat reduces performance/efficiency.

Superheat, as used here, is defined as the temperature difference between the refrigerant at the location of interest and the temperature at which the refrigerant would become a saturated vapor, assuming the same pressure and that the refrigerant temperature is greater than the saturated vapor temperature. For example, if the refrigerant is at 5° C. and would become a saturated vapor at −7° C. at the same pressure, the refrigerant has a superheat value of 12° C.

The controller 99 sends a signal to the actuator for the expansion valve 36 to increase valve position (open the valve more) if the calculated superheat value is less than the reference superheat value. The controller 99 sends a signal to the actuator for the expansion valve 36 to decrease valve position (close the valve more) if the calculated superheat value is greater than the reference superheat value.

FIG. 4 shows an example gas turbine engine 800 as a two-spool turbofan engine. Although shown as a high bypass turbofan, a low bypass turbofan may have similar features. The engine 800 has an engine case 822 surrounding a centerline or central longitudinal axis 500. An example engine has a fan section 824 including a fan 826 within a fan case 828. The example engine includes an inlet 830 at an upstream end of the fan case receiving an inlet flow along an inlet flowpath 520. The fan 826 has one or more stages 832 of fan blades (typically one in a high bypass turbofan and more in a low bypass turbofan). Downstream of the fan blades, the flowpath 520 splits into an inboard portion 522 being a core flowpath and passing through a core of the engine and an outboard portion 524 being a bypass flowpath exiting an outlet 834 of the fan case.

The core flowpath 522 proceeds downstream to an engine outlet 836 through one or more compressor sections, a combustor, and one or more turbine sections. The example engine has two axial compressor sections and two axial turbine sections, although other configurations are equally applicable. From upstream to downstream there is a low pressure compressor section (LPC) 840, a high pressure compressor section (HPC) 842, a combustor section 844, a high pressure turbine section (HPT) 846, and a low pressure turbine section (LPT) 848. Each of the LPC, HPC, HPT, and LPT comprises one or more stages of blades which may be interspersed with one or more stages of stator vanes. In many low bypass turbofan configurations, the core and bypass flows rejoin to exit a nozzle (e.g., a variable nozzle).

In the example engine, the blade stages of the LPC and LPT are part of a low pressure spool mounted for rotation about the axis 500. The example low pressure spool includes a shaft (low pressure shaft) 850 which couples the blade stages of the LPT to those of the LPC and allows the LPT to drive rotation of the LPC. In the example engine, the shaft 850 also drives the fan. In the example implementation, the fan is driven via a transmission (not shown, e.g., a fan gear drive system such as an epicyclic transmission) to allow the fan to rotate at a lower speed than the low pressure shaft.

The example engine further includes a high pressure shaft 852 mounted for rotation about the axis 500 and coupling the blade stages of the HPT to those of the HPC to allow the HPT to drive rotation of the HPC. In the combustor 844, fuel is introduced to compressed air from the HPC and combusted to produce a high pressure gas which, in turn, is expanded in the turbine sections to extract energy and drive rotation of the respective turbine sections and their associated compressor sections (to provide the compressed air to the combustor) and fan. The example bleed port forming the inlet 40 is an inter-section bleed between LPC and HPC. Alternatives are inter-stage bleeds within the LPC.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration of aircraft, engine, or ECS, details of such baseline may influence details of particular implementations. Accordingly, other embodiments are within the scope of the following claims.

What is claimed is:

1. An environmental control system (ECS) for use with a gas turbine engine, the ECS comprising:
   an air cycle system (ACS); and
   a vapor cycle system (VCS),
wherein:
   the VCS comprises along a vapor compression flowpath:
      a VCS compressor;

a heat donor leg of a VCS condenser;
an expansion device; and
a heat receiving leg of a VCS evaporator; and
the ACS comprises along a bleed flowpath:
a bleed air inlet;
a primary heat exchanger;
an ACS compressor;
a secondary heat exchanger;
a first turbine coupled to the ACS compressor to drive the ACS compressor;
a heat donor leg of the VCS evaporator;
a water collector;
a heat receiving leg of the VCS condenser; and
a second turbine; and
the VCS compressor is a motor-driven compressor; and
the bleed flowpath passes downstream from the heat receiving leg of the VCS condenser to the second turbine.

2. The environmental control system of claim 1 further comprising:
a valve positioned to bypass the turbine to pass a portion of flow along the bleed flowpath from the secondary heat exchanger around the first turbine to the heat donor leg of the VCS evaporator.

3. The environmental control system of claim 1 wherein:
the bleed flowpath passes sequentially from the heat donor leg of the VCS evaporator to the water collector and then to the heat receiving leg of the VCS condenser.

4. The environmental control system of claim 3 wherein:
the water collector is a can-type collector.

5. The environmental control system of claim 1 wherein:
the first turbine is downstream of the secondary heat exchanger and upstream of the heat donor leg of the VCS evaporator along the bleed flowpath.

6. The environmental control system of claim 5 wherein:
the heat donor leg of the VCS evaporator;
the water collector; and
the heat receiving leg of the VCS condenser are downstream of the first turbine and upstream of the second turbine along the bleed flowpath.

7. The environmental control system of claim 5 further comprising:
a heat transfer liquid flowpath;
a cooling load on the heat transfer liquid flowpath; and
at least one liquid load heat exchanger thermally coupling the bleed flowpath and heat transfer liquid flowpath.

8. The environmental control system of claim 7 wherein:
the at least one liquid load heat exchanger comprises:
a first liquid load heat exchanger downstream of the first turbine and upstream of the second turbine along the bleed flowpath; and
a second liquid load heat exchanger downstream the second turbine along the bleed flowpath.

9. The environmental control system of claim 1 further comprising:
a ram air flowpath passing through the primary heat exchanger and the secondary heat exchanger, wherein the VCS lacks direct heat exchange with the ram flowpath.

10. The environmental control system of claim 1 wherein:
the ACS lacks a condensing/reheating loop.

11. The environmental control system of claim 1 included within an aircraft, the aircraft further comprising:
an engine having a compressor bleed port along the bleed flowpath.

12. The environmental control system included within the aircraft of claim 11, the aircraft further comprising:
a ram air flowpath passing through the primary heat exchanger and the secondary heat exchanger.

13. The environmental control system included within the aircraft of claim 12 wherein the environmental control system further comprises:
a heat transfer liquid flowpath;
a cooling load on the heat transfer liquid flowpath, the cooling load comprising at least one radar transmit/receive module; and
at least one liquid load heat exchanger thermally coupling the bleed flowpath and heat transfer liquid flowpath.

14. A method for using the environmental control system of claim 1, the method comprising:
running a gas turbine engine;
directing bleed air along the bleed flowpath from the gas turbine engine; and
the bleed air driving the first turbine and second turbine to drive the ACS compressor.

15. The method of claim 14 further comprising:
bypassing the first turbine to control an inlet temperature to the heat donor leg of the VCS evaporator.

16. An environmental control system (ECS) for use with a gas turbine engine, the ECS comprising:
an air cycle system (ACS); and
a vapor cycle system (VCS),
wherein:
the VCS comprises along a vapor compression flowpath:
a VCS compressor;
a heat donor leg of a VCS condenser;
an expansion device; and
a heat receiving leg of a VCS evaporator;
the ACS comprises along a bleed flowpath:
a bleed air inlet;
a primary heat exchanger;
an ACS compressor;
a secondary heat exchanger;
a first turbine coupled to the ACS compressor to drive the ACS compressor;
a heat donor leg of the VCS evaporator;
a water collector;
a heat receiving leg of the VCS condenser; and
a second turbine,
the first turbine is downstream of the secondary heat exchanger and upstream of the heat donor leg of the VCS evaporator along the bleed flowpath; and
the heat donor leg of the VCS evaporator, the water collector, and the heat receiving leg of the VCS condenser are downstream of the first turbine and upstream of the second turbine along the bleed flowpath.

17. The environmental control system of claim 16 and included within an aircraft, the aircraft further comprising:
an engine having a compressor bleed port along the bleed flowpath.

18. An environmental control system (ECS) for use with a gas turbine engine, the ECS comprising:
an air cycle system (ACS); and
a vapor cycle system (VCS),
wherein:
the VCS comprises along a vapor compression flowpath:
a VCS compressor;
a heat donor leg of a VCS condenser;
an expansion device; and
a heat receiving leg of a VCS evaporator;
the ACS comprises along a bleed flowpath:
a bleed air inlet;
a primary heat exchanger;
an ACS compressor;

a secondary heat exchanger;
a first turbine coupled to the ACS compressor to drive the ACS compressor;
a heat donor leg of the VCS evaporator;
a water collector;
a heat receiving leg of the VCS condenser; and
a second turbine;
the first turbine is downstream of the secondary heat exchanger and upstream of the heat donor leg of the VCS evaporator along the bleed flowpath
the ECS further comprises:
a heat transfer liquid flowpath;
a cooling load on the heat transfer liquid flowpath; and
at least one liquid load heat exchanger thermally coupling the bleed flowpath and heat transfer liquid flowpath; and
the at least one liquid load heat exchanger comprises:
a first liquid load heat exchanger downstream of the first turbine and upstream of the second turbine along the bleed flowpath; and
a second liquid load heat exchanger downstream the second turbine along the bleed flowpath.

19. The environmental control system of claim 18 and included within an aircraft, the aircraft further comprising:
an engine having a compressor bleed port along the bleed flowpath.

* * * * *